(12) United States Patent
Balistreri et al.

(10) Patent No.: US 10,864,783 B2
(45) Date of Patent: Dec. 15, 2020

(54) VALVE ASSEMBLY FOR A TIRE INFLATION SYSTEM

(71) Applicant: DANA HEAVY VEHICLE SYSTEMS GROUP, LLC, Maumee, OH (US)

(72) Inventors: Lucas A. Balistreri, Bowling Green, OH (US); Pheng Lee, Holland, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 286 days.

(21) Appl. No.: 16/073,178

(22) PCT Filed: Jan. 27, 2017

(86) PCT No.: PCT/US2017/015275
§ 371 (c)(1),
(2) Date: Jul. 26, 2018

(87) PCT Pub. No.: WO2017/132472
PCT Pub. Date: Aug. 3, 2017

(65) Prior Publication Data
US 2019/0047335 A1 Feb. 14, 2019

Related U.S. Application Data

(60) Provisional application No. 62/288,933, filed on Jan. 29, 2016.

(51) Int. Cl.
*B60C 23/00* (2006.01)
*F16K 17/30* (2006.01)
*F16K 15/06* (2006.01)

(52) U.S. Cl.
CPC ...... *B60C 23/00354* (2020.05); *B60C 23/003* (2013.01); *F16K 15/06* (2013.01); *F16K 15/063* (2013.01); *F16K 17/30* (2013.01)

(58) Field of Classification Search
CPC ............ B60C 23/003; B60C 23/00354; B60C 29/002; F16K 15/20; F16K 15/06; F16K 15/063; F16K 17/30
See application file for complete search history.

(56) References Cited

U.S. PATENT DOCUMENTS 2,010,250 A 8/1935 Appelgate
2,141,543 A 12/1938 Mann, Jr.
(Continued)

FOREIGN PATENT DOCUMENTS

DE 102008062066 A1 6/2010
DE 102008062072 A1 6/2010
(Continued)

OTHER PUBLICATIONS

European Patent Office, International Search Report and Written Opinion issued in International Application No. PCT/US2017/015275, dated May 30, 2017, 12 pages, European Patent Office, Rijswijk Netherlands.
(Continued)

*Primary Examiner* — Kip T Kotter
(74) *Attorney, Agent, or Firm* — McCoy Russell LLP

(57) ABSTRACT

An assembly for a tire inflation system includes a valve assembly. The valve assembly includes a housing. The housing includes a base portion (56) and a cap portion (58). The base portion has a base perforation (90). The base perforation (90) is in fluid communication with a base cavity. The cap portion (58) is attached to the base portion (56). The cap portion (58) has a cap perforation (54) formed therein. The cap perforation (54) is in selective fluid communication with the base cavity. A piston (62) is disposed in the base cavity. A first area (A1) is defined by the base perforation (90), a second area (A2) is defined by the lateral area of a cylindrical space between the piston (62) and the cap portion (58), and a third area (A3) is defined by the cap
(Continued)

perforation (54). The second area (A2) is greater than the first area (A1) and the third area (A3).

17 Claims, 4 Drawing Sheets

(56) References Cited

U.S. PATENT DOCUMENTS

| | | | |
|---|---|---|---|
| 2,944,579 A | 7/1960 | Kamm | |
| 3,276,503 A | 10/1966 | Kilmarx | |
| 3,456,676 A | 7/1969 | Stuck | |
| 3,489,166 A | 1/1970 | Williams | |
| 3,542,062 A | 11/1970 | Zahid | |
| 3,724,488 A | 4/1973 | Featherstone | |
| 3,747,626 A | 7/1973 | Valentino | |
| 3,789,867 A | 2/1974 | Yabor | |
| 3,890,999 A | 6/1975 | Moskow | |
| 3,995,656 A | 12/1976 | Mills, Jr. | |
| 4,171,119 A | 10/1979 | Lamson | |
| 4,269,223 A | 5/1981 | Carter | |
| 4,480,580 A | 11/1984 | Nalence | |
| 4,641,698 A | 2/1987 | Bitonti | |
| 4,685,501 A | 8/1987 | Williams | |
| 4,724,879 A | 2/1988 | Schultz | |
| 4,744,399 A | 5/1988 | Magnuson | |
| 4,765,385 A | 8/1988 | McGeachy | |
| 4,768,574 A | 9/1988 | Probst | |
| 4,895,199 A * | 1/1990 | Magnuson | B60C 23/003 137/102 |
| 4,922,946 A | 5/1990 | Boulicault | |
| 5,029,604 A | 7/1991 | Spektor | |
| 5,181,977 A | 1/1993 | Gneiding | |
| 5,253,687 A | 10/1993 | Beverly | |
| 5,261,471 A | 11/1993 | Freigang | |
| 5,293,919 A | 3/1994 | Olney | |
| 5,411,051 A | 5/1995 | Olney | |
| 5,413,159 A | 5/1995 | Olney | |
| 5,587,698 A | 12/1996 | Genna | |
| 5,647,927 A | 7/1997 | Mason | |
| 5,713,386 A | 2/1998 | Heredia Batista | |
| 6,142,168 A | 11/2000 | Sumrall | |
| 6,209,350 B1 | 4/2001 | Kimble | |
| 6,250,327 B1 | 6/2001 | Freignang et al. | |
| 6,302,138 B1 | 10/2001 | Sumrall | |
| 6,374,852 B1 * | 4/2002 | Olivas | F16K 17/30 137/493.9 |
| 6,427,714 B2 | 8/2002 | Freigang | |
| 6,561,017 B1 | 5/2003 | Claussen | |
| 6,604,414 B1 | 8/2003 | Claussen | |
| 6,634,375 B2 | 10/2003 | Olivas | |
| 6,758,088 B2 | 7/2004 | Claussen | |
| 6,865,930 B1 | 3/2005 | Claussen | |
| 6,868,719 B1 | 3/2005 | Claussen | |
| 6,880,598 B2 | 4/2005 | Haunhorst | |
| 6,943,673 B2 | 9/2005 | Skoff | |
| 7,032,611 B1 | 4/2006 | Sheng | |
| 7,051,585 B2 | 5/2006 | Claussen | |
| 7,079,047 B2 | 7/2006 | Boulot | |
| 7,188,638 B1 | 3/2007 | Peach | |
| 7,191,796 B1 | 3/2007 | Rehmert, Jr. | |
| 7,437,920 B2 | 10/2008 | Beverly | |
| 7,493,808 B2 | 2/2009 | Milanovich | |
| 7,509,969 B2 | 3/2009 | Huang | |
| 7,686,051 B2 | 3/2010 | Medley | |
| RE41,756 E | 6/2010 | Claussen | |
| 8,113,234 B2 | 2/2012 | Campau | |
| 8,136,561 B2 | 3/2012 | Sandoni | |
| 8,256,447 B2 | 9/2012 | Badstue | |
| 8,307,868 B2 | 11/2012 | Medley | |
| 8,307,869 B2 | 11/2012 | Medley | |
| 8,353,311 B2 | 1/2013 | Rigamonti | |
| 8,356,620 B2 | 1/2013 | Colussi | |
| 8,596,560 B2 | 12/2013 | Morgan | |
| 8,844,596 B2 | 9/2014 | Medley | |
| 9,296,264 B2 | 3/2016 | Mozingo | |
| 9,308,788 B2 | 4/2016 | Fazekas | |
| 9,403,410 B2 | 8/2016 | Mozingo | |
| 2002/0134428 A1 | 9/2002 | Gabelmann | |
| 2002/0157707 A1 | 10/2002 | Sampson | |
| 2002/0170597 A1 * | 11/2002 | Colussi | B60C 23/003 137/226 |
| 2003/0075219 A1 | 4/2003 | Carroll | |
| 2007/0023083 A1 | 2/2007 | Huang | |
| 2008/0223457 A1 | 9/2008 | Kobziar | |
| 2009/0032619 A1 | 2/2009 | Morgan | |
| 2011/0057138 A1 | 3/2011 | Maus | |
| 2011/0174394 A1 | 7/2011 | Kristoffersen | |
| 2011/0221261 A1 | 9/2011 | Eaton | |
| 2011/0272618 A1 | 11/2011 | Mosler | |
| 2011/0308637 A1 | 12/2011 | Tsiberidis | |
| 2011/0315235 A1 * | 12/2011 | Colefax | B60C 23/0408 137/224 |
| 2012/0138826 A1 | 6/2012 | Morris | |
| 2013/0240060 A1 | 9/2013 | Morgan | |
| 2013/0276902 A1 | 10/2013 | Medley | |
| 2013/0282232 A1 | 10/2013 | Medley | |
| 2015/0165846 A1 | 6/2015 | Sidders | |

FOREIGN PATENT DOCUMENTS

| | | |
|---|---|---|
| EP | 0206949 A1 | 12/1986 |
| FR | 1432885 | 3/1966 |
| FR | 2149276 | 3/1973 |
| FR | 2619762 A1 | 3/1989 |
| GB | 410531 | 5/1934 |
| GB | 646891 | 11/1950 |
| GB | 1037494 | 7/1966 |
| GB | 1346130 | 2/1974 |
| GB | 2312268 A | 10/1997 |
| WO | 9114120 | 9/1991 |
| WO | 2002062595 | 8/2002 |
| WO | 2004030952 | 4/2004 |
| WO | 2010094067 | 8/2010 |
| WO | 2011028346 A1 | 3/2011 |
| WO | 2014028142 | 2/2014 |
| WO | 2015103018 | 7/2015 |

OTHER PUBLICATIONS

European Patent Office, The International Search Report and Written Opinion, issued in PCT/US2014/072037, dated Mar. 5, 2015, 9 pages, European Patent Office, Rijswijk, Netherlands.

* cited by examiner

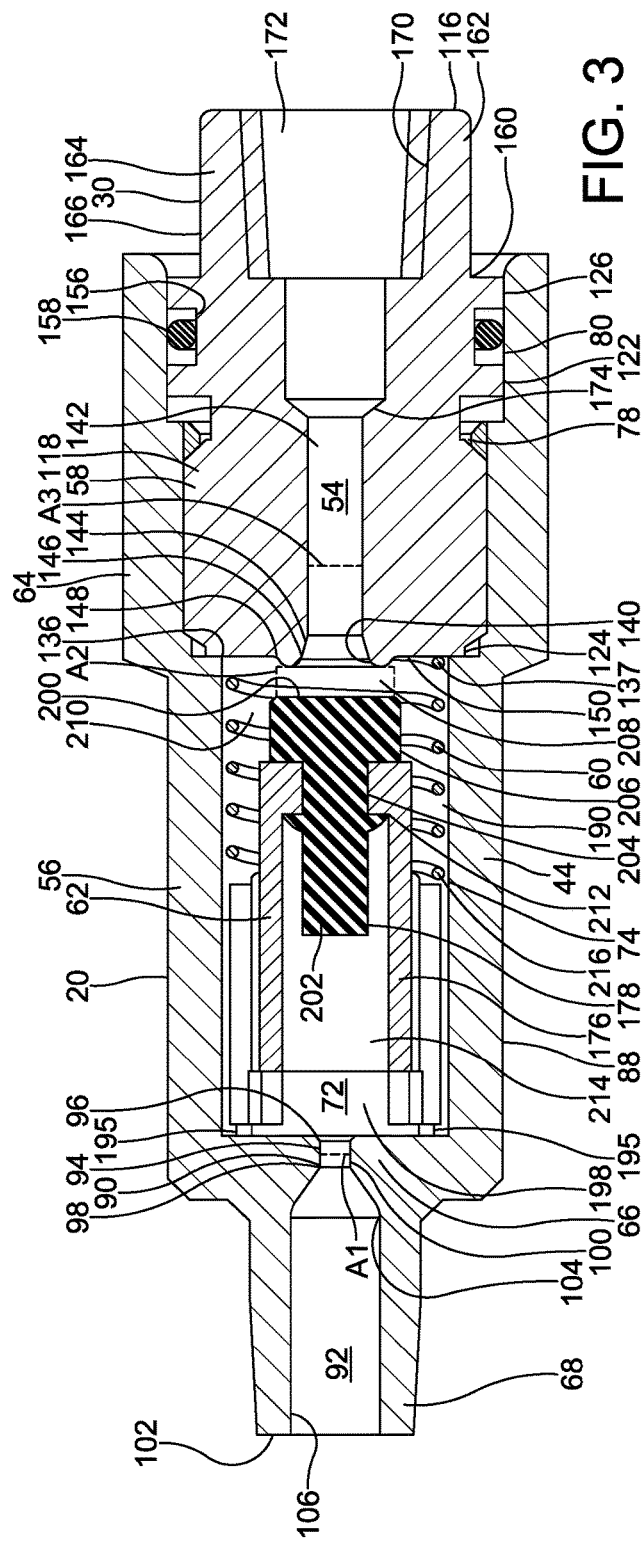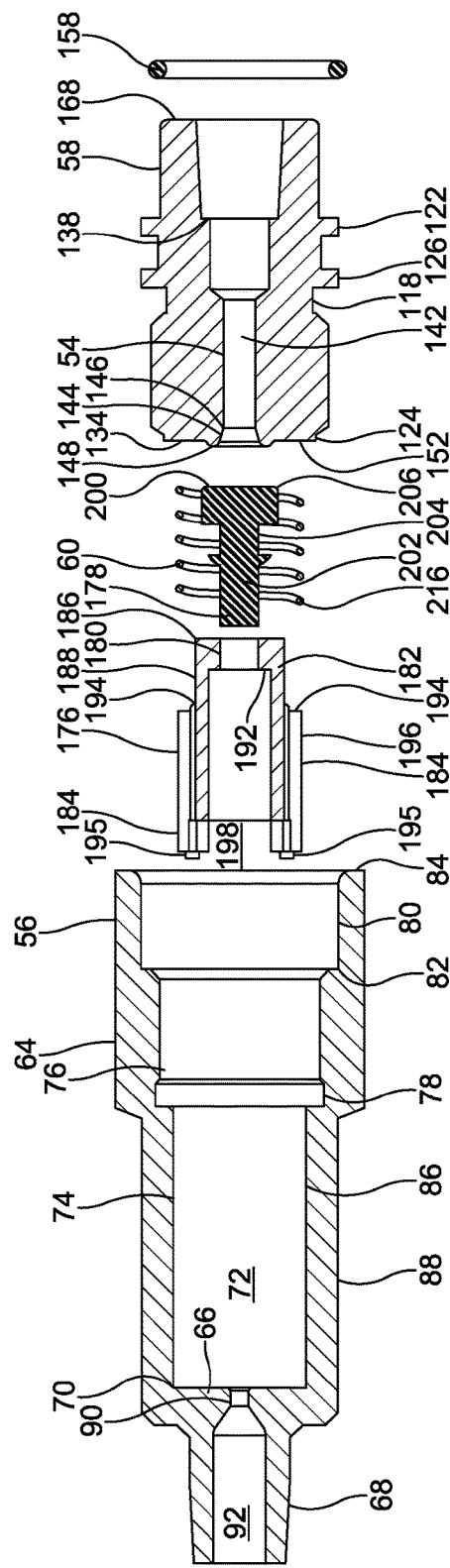

US 10,864,783 B2

VALVE ASSEMBLY FOR A TIRE INFLATION SYSTEM

CROSS-REFERENCE TO RELATED APPLICATION

This application is claiming the benefit, under 35 U.S. C. 119(e), of the provisional U.S. patent application which was granted Ser. No. 62/288,933 and filed on Jan. 29, 2016, the entire disclosure of which is hereby incorporated by reference.

BACKGROUND OF THE INVENTION

The invention relates to an assembly for a tire inflation system.

Vehicles which have tire inflation systems such as, for example, central tire inflation systems may employ wheel valves to retain air in their wheels and adjust or maintain the pressure thereof. Conventional wheel valves may suffer from performance issues due to the range of temperatures they operate in, the operating pressures they are exposed to and/or the specialized functions they are designed to perform.

Therefore, it would be advantageous to develop an assembly that is inexpensive, operable in an increased temperature range at higher pressures and can be used with an existing wheel valve to overcome the aforementioned limitations of the wheel valve.

BRIEF SUMMARY OF THE INVENTION

Embodiments of an assembly for a tire inflation system are provided. In an embodiment, the assembly comprises a valve assembly. The valve assembly includes a housing. The housing comprises a base portion and a cap portion. The base portion has a base perforation. The base perforation is in fluid communication with a base cavity. The cap portion is attached to the base portion. The cap portion has a cap perforation formed therein. The cap perforation is in selective fluid communication with the base cavity. A piston is disposed in the base cavity. A first area is defined by the cap perforation, a second area is defined by a space between the piston and the cap portion, and a third area is defined by the base perforation. The second area is greater than the first area and the third area.

BRIEF DESCRIPTION OF THE SEVERAL VIEWS OF THE DRAWINGS

The above, as well as other advantages of the process will become readily apparent to those skilled in the art from the following detailed description when considered in the light of the accompanying drawings in which:

FIG. 3 depicts an enlarged view of a portion of the assembly of FIG. 2;

FIG. 4 depicts an exploded view of the portion of the assembly of FIG. 3; and

DETAILED DESCRIPTION OF THE INVENTION

Figure 1:
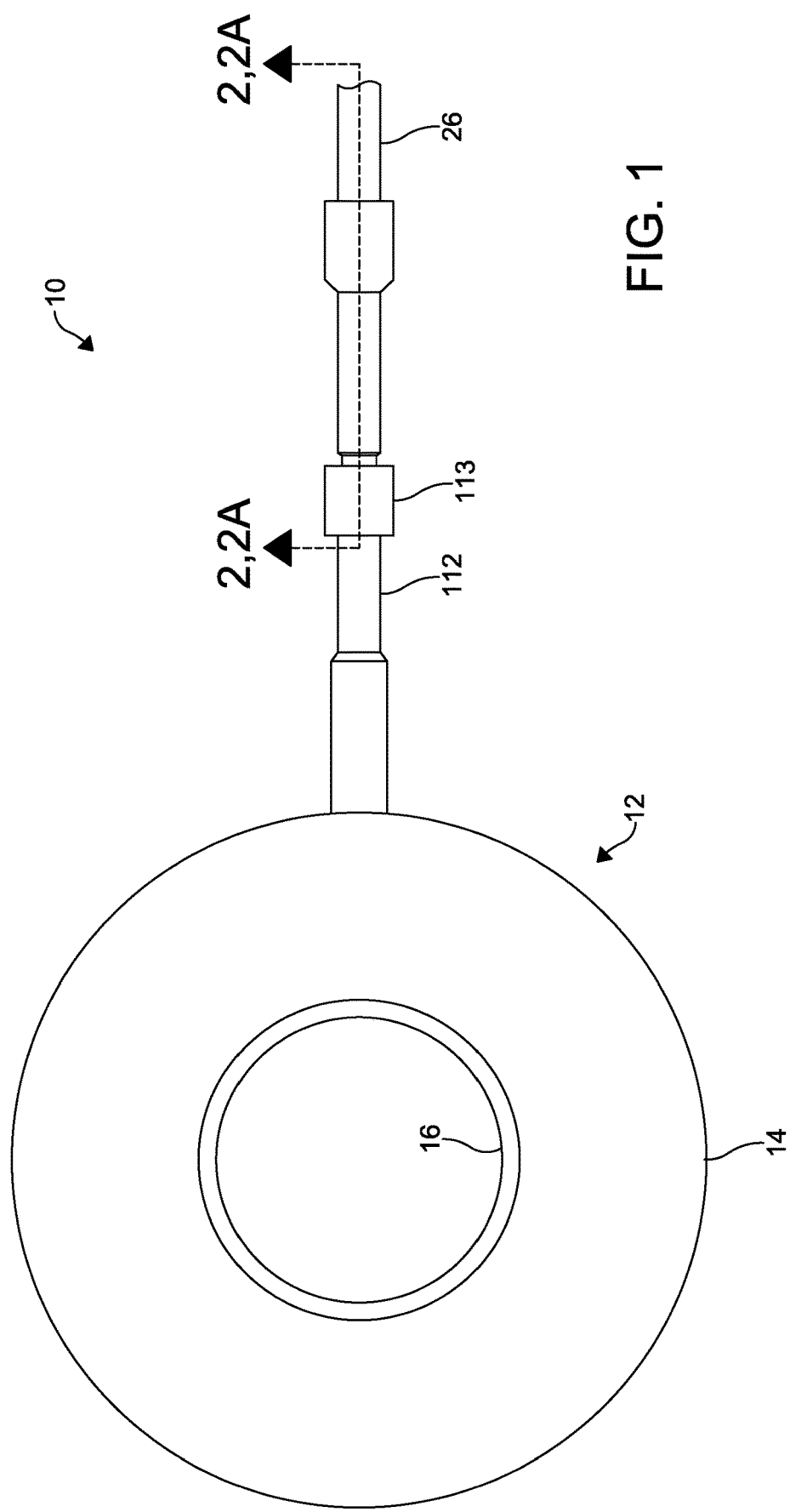
FIG. 1 depicts a plan view of an assembly in accordance with the invention.

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise. Also, although they may not be, like elements in various embodiments may be commonly referred to with like reference numerals within this section of the application.

Various embodiments of an assembly 10 are described herein. The embodiments of the assembly 10 may have applications to commercial and off-highway vehicles. Also, it would be understood by one of ordinary skill in the art that these embodiments could have industrial, locomotive, military and aerospace applications.

Referring now to FIG. 1, the assembly 10 is preferably utilized in or as a portion of a tire inflation system to check, increase and/or decrease the pressure of air housed within a wheel 12. Preferably, the tire inflation system is of the central tire inflation system (CTIS) variety. The wheel 12 is formed by sealingly attaching a tire 14 to an outer surface of a wheel rim 16. Tires and wheel rims which are conventional in the art are suitable for use with the assembly 10. The wheel 12 may house pressurized air at a pressure from about 5 to 130 psi. More preferably, the wheel 12 houses pressurized air at a pressure from about 30 to 130 psi. The pressure of the air housed within the wheel 12 may also be referred to herein as "tire pressure."

The tire inflation system preferably comprises an inflation system conduit (not depicted) in selective fluid communication with an air supply (not depicted) and/or the wheel 12 via the assembly 10. The inflation system conduit is utilized to communicate pressurized air from the air supply or the wheel 12. The air supply provides pressurized air when it is desired to check, increase and/or decrease the tire pressure. The pressurized air provided by the air supply is at a pressure that is greater than the tire pressure. The pressurized air provided by the air supply may be at a pressure of 130 psi or more.

Embodiments of the assembly 10 will now be described with reference to FIGS. 1-5.

The assembly 10 comprises a first housing 18 and a second housing 20. The first housing 18 and the second housing 20 are preferably each metallic. However, it should be understood that the first housing and/or the second housing may be formed utilizing other materials. The first housing 18 and the second housing 20 may be formed in a unitary manner. In other embodiments like the ones illustrated in FIGS. 2-4, the first housing 18 and second housing 20 are attached together but are provided as separate components.

The first housing 18 comprises a first end 22 attached to a first end portion 24. A hose member 26 is provided in the first end 22 and is attached to the first end portion 24 of the first housing 18. The hose member 26 may be attached to the first housing 18 by a crimping process which provides a crimp (not depicted) in the first end portion 24. The first housing 18 also comprises a second end portion 28 which is directly attached to a cap portion 30 of the second housing 20. In certain embodiments, the second end portion 28 is attached to the cap portion 30 via a threaded connection 32.

In an embodiment, the first end portion 24 has an outer diameter 34 which is substantially constant. The outer diameter 34 of the first end portion 24 is greater than an outer diameter 36 of the second end portion 28. In certain embodiments, the second end portion 28 may comprise a ramped transition 38. The ramped transition 38 is attached to the first end portion 24 and separates the first end portion 24 from a connecting portion 39 of the second end portion 28. A fluid conduit 40 is provided in and extends through the first housing 18. The fluid conduit 40 enables fluid communication between the hose member 26 and a valve assembly 44.

On an end 46, the hose member 26 is in fluid communication with the first housing 18 via another fluid conduit 42 provided therethrough. The fluid conduit 42 extends through the hose member 26 and is in fluid communication with the fluid conduit 40 provided through the first housing 18 to enable fluid communication between the hose member 26 and the first housing 18. On an opposite end (not depicted), the hose member 26 and fluid conduit 42 are in fluid communication with the remaining portion of the central tire inflation system via the inflation system conduit.

On an opposite end 52 of the first housing 18, the fluid conduit 40 is in fluid communication with the valve assembly 44 via a perforation 54 formed in the second housing 20. The second housing 20 is provided as a portion of the valve assembly 44. Preferably, the second housing 20 comprises a base portion 56 and a cap portion 58. The cap portion 58 is attached to the base portion 56. The valve assembly 44 also comprises a piston 62 positioned within the second housing 20. In certain embodiments, the valve assembly 44 further comprises a biasing member 60 that is also positioned within the second housing 20.

The base portion 56 is a generally cylindrical member into which the cap portion 58, biasing member 60 and piston 62 are disposed. As best illustrated in FIGS. 3-4, the base portion 56 comprises an outer wall portion 64, a lower wall portion 66, and a stem portion 68. Preferably, the base portion 56 is unitarily formed by casting a metal. However, it should be understood that the base portion 56 may be formed using other materials and processes. It should also be understood that the base portion 56 may be formed by joining a plurality of components.

The outer wall portion 64 is of a generally cylindrical shape. The outer wall portion 64 is attached to the lower wall portion 66 at a first end 70 thereof and extends away therefrom. The outer wall portion 64 and the lower wall portion 66 define a base cavity 72. Preferably, the outer wall portion 64 comprises an inner surface 74 which includes a first diameter portion 78 and a second diameter portion 80. The second diameter portion 80 has a diameter which is greater than a diameter of the first diameter portion 78. In certain embodiments, a transition 82 connects the first diameter portion 78 and the second diameter portion 80. The transition 82 between the first diameter portion and the second diameter portion is sharply defined. As illustrated, the second diameter portion 80 is attached to an end 84 of the base portion 56. The inner surface 74 may also comprise a third diameter portion 86. In these embodiments, the third diameter portion 86 is separated from the second diameter portion 80 by the first diameter portion 78 and the third diameter portion 86 is attached to the end 70 of the outer wall portion 64. The third diameter portion 86 has a diameter which is less than the diameter of the first diameter portion 78.

An outer surface 88 of the outer wall portion 64 may be knurled or have one or more flat portions to enable construction of the assembly 10. In other embodiments, the outer surface 88 may include a thread portion formed thereon for engaging a thread formed in a component the assembly is coupled to. In an embodiment, the outer surface 88 of the outer wall portion 64 is of a substantially constant diameter.

The lower wall portion 66 is attached to the outer wall portion 64 on a side and the stem portion 68 on an opposite side thereof. The lower wall portion 66 is in a perpendicular relationship with both the outer wall portion 64 and the stem portion 68. The lower wall portion 66 defines a perforation 90 formed in the base portion 56, which hereinafter may also be referred to herein as the "base perforation." The base perforation 90 extends through the lower wall portion 66 and allows the base cavity 72 to communicate with a stem cavity 92.

The base perforation 90 is shaped to promote pressure loss as pressurized air flows through an orifice constriction and to set a relative flow rate of the air that enters the base cavity 72 or the stem cavity 92. In an embodiment, the diameter 94 of the base perforation 90 varies from a first end 96 adjacent the base cavity 72 toward a second end 98 adjacent the stem cavity 92. In this embodiment, it is preferred that the diameter 94 of the base perforation 90 gradually decreases in length from the first end 96 to a reduced diameter near a center portion 100 of the lower wall portion 66. The base perforation 90 may have a substantially constant diameter in the center portion 100 through the center portion to the stem cavity 92. In other embodiments (not depicted), the diameter of the base perforation may be defined by a pair of circular fillets formed in the lower wall portion or by conic sections.

The stem portion 68 is of a generally cylindrical shape and a portion thereof forms a first end 102 of the second housing 20. The stem portion 68 is attached to the lower wall portion 66 at a first end 104 thereof and extends away therefrom. The lower wall portion 66 and the stem portion 68 define the stem cavity 92. An inner surface 106 of the stem portion 68 may include a groove (not depicted) formed therein for engaging a retaining ring (not depicted) disposed in the stem cavity 92. A filter 105 and a washer (not depicted), which secures the filter to the stem portion 68 and fixes the position of the filter 105 relative to the remaining portions of the assembly 10, may also be disposed in the stem cavity 92. The inner surface 106 of the stem portion 68 defines the stem cavity 92. A portion of the stem cavity 92 may gradually increase in diameter from the base perforation 90 toward the first end 102 of the second housing 20. The remaining portion of the stem cavity 92 may be of a substantially constant diameter. Preferably, the filter 105 is disposed in the remaining portion of the stem cavity 92.

Referring back to FIGS. 1-2, a Schrader valve is in fluid communication with the wheel 12 on an end and with the assembly 10 on an opposite end via an adapter 113. The Schrader valve is positioned within a valve stem 112. On an end, the adapter 113 is attached to the valve stem 112 via a threaded connection.

On an opposite end, the adapter 113 is attached to an outer surface 107 of the stem portion 68 via a threaded connection 109. The adapter 113 is a generally cylindrical member and includes a fluid conduit 114. On an end, the fluid conduit 114 is in fluid communication with the stem cavity 92. On an opposite end, the fluid conduit 114 is in fluid communication with the Schrader valve. The stem portion 68 is attached to the adapter 113 so that fluid communication between the wheel 12 and assembly 10 is available via the Schrader valve. The adapter 113 comprises a depressor member 115. The depressor member 115 is in contact with the Schrader valve. Contact between the Schrader valve and the depressor member opens the Schrader valve and maintains the Schrader valve in an open state to allow the wheel 12 and assembly 10 to be in uninterrupted fluid communication.

Referring back to FIGS. 3-4, the cap portion 58 is disposed within and secured to the base portion 56. Preferably, the cap portion 58 and the base portion 56 are secured together via an interlock provided by a mechanical fastener such as, for example, a retaining ring or via a threaded connection. In other embodiments (not depicted), the base portion and the cap portion may be formed in a unitary manner. An end of the cap portion 58 forms a second end 116 of the second housing 20. The second end 116 of the second housing 20 is provided on an end of the valve assembly 44 opposite the first end 102 of the second housing 20.

The cap portion 58 comprises an inboard portion 118, a wall portion 134 and the perforation 54, which hereinafter may also be referred to herein as the "cap perforation." The cap perforation 54 is formed through the inboard portion 118 and wall portion 134, respectively. Preferably, the cap portion 58 is unitarily formed by casting a metal. However, it should be understood that the cap portion 58 may be formed using other materials and processes. It should also be understood that the cap portion 58 may be formed by joining a plurality of components.

The inboard portion 118 is disposed within the base portion 56 and comprises an outer surface 122 which abuts the inner surface 74 of the base portion 56. The inboard portion 118 comprises a first diameter portion 124 and a second diameter portion 126. The first diameter portion 124 is attached to the second diameter portion 126. Preferably, an outer diameter of the second diameter portion 126 is greater than an outer diameter of the first diameter portion 124. Thus, the inboard portion 118 decreases in diameter from the second diameter portion 126 to the first diameter portion 124.

The first diameter portion 124 of the cap portion 58 is disposed in the first diameter portion 78 of the inner surface 74 of the base portion 56. The wall portion 134 is attached to the first diameter portion 124 on an end thereof. The wall portion 134 is substantially ring-shaped. The wall portion 134 and the inner surface 74 of the base portion 56 define a groove 136. The groove 136 is an annular recess which receives a second member end 137 of the biasing member 60. The wall portion 134 defines a portion of the cap perforation 54 which is formed therethrough.

The cap perforation 54 is aligned with the base perforation 90. The cap perforation 54 is shaped to militate against pressure losses that occur as pressurized air flows through an orifice constriction and to set a relative flow rate for the air as it is directed through the assembly 10. The cap perforation 54 is formed in and through the cap portion 58. A first end 138 of the cap portion 58 is in fluid communication with the fluid conduit 40 and a second end 140 is in fluid communication with the piston 62 when the valve assembly 44 is closed. The cap perforation 54 has a first portion 142 which has a diameter of a length that is substantially constant and a second portion 144 which has a diameter of a length which varies. The first portion 142 is preferably of a cylindrical shape. The second portion 144 is defined by a portion 146 of the wall portion 134 and gradually increases in diameter toward the base cavity 72 to a ridge 148 provided on an inboard face 150 of the wall portion 134.

The diameter of the second portion 144 is greater than the diameter of the first portion 142. Alternatively, the cap perforation may be of or defined by other shapes that militate against pressure losses that occur as pressurized air flows through an orifice constriction. For example, in an embodiment (not depicted), the second portion may be defined by a pair of circular fillets formed in the wall portion and the inboard face. In still other embodiments (not depicted), the first portion and/or second portion may be defined by other conic sections. Furthermore, it should be understood that the wall portion may include at least one additional feature to facilitate applying a pressurized air to the base cavity. In certain embodiments (not depicted), the at least one additional feature may be one of a hollow cylindrical protuberance extending from the wall portion, a thread formed in the wall portion, or a fitting adapted to receive a coupling.

The ridge 148 is formed about and abuts the second end 140 of the cap perforation 54. The ridge 148 is shaped to promote sealing between the piston 62 and the cap portion 58 and militate against pressure losses that occur as pressurized air flows through an orifice constriction. Preferably, the ridge 148 is an annular body and is hemispherical in cross-section. However, it should be appreciated that the cross-sectional shape of the ridge may be of another shape.

The inboard face 150 comprises a first surface 152. The first surface 152 is an annular portion that is attached to the ridge 148. In the embodiments shown in FIGS. 3-4, the first surface 152 separates the ridge 148 from the inner surface 74 of the base portion 56.

As best shown in FIG. 3, the second diameter portion 126 is attached to the second diameter portion 80 of the inner surface 74. An annular groove 156 is formed in the second diameter portion 126. A seal is provided between the cap portion 30 and base portion 56 to prevent fluid loss therebetween. The seal is provided by disposing a sealing member 158 in the second annular groove 156. The sealing member 158 has an annular shape and is formed of rubber or another suitable material. In an embodiment, the sealing member 158 is an O-ring.

The inboard portion 118 is attached on an end 160 to an outboard portion 162. Preferably, the inboard portion 118 and outboard portion 162 are aligned. The outboard portion 162 is disposed at the end 84 of the base portion 56. The outboard portion 162 comprises an outer wall portion 164. The outer wall portion 164 comprises an outer surface 166 which has a generally cylindrical shape. An end 168 of the outboard portion 162 defines the second end 116 of the second housing 20. The outboard portion 162 comprises a receiving portion 170 which includes an aperture 172 which comprises a threaded portion for receiving the connecting portion 39 and attaching the first housing 18 to the second housing 20 via the threaded connection 32. The cap perforation 54 extends into the outboard portion 162 to communicate with the fluid conduit 40. The cap perforation 54 includes a transition portion 174 that gradually increases in diameter toward the end 52 of the first housing 20.

As shown best in FIGS. 3-4, the piston 62 comprises a shuttle 176 and a plug member 178 attached to the shuttle 176. The plug member 178 is engaged with the shuttle 176 via an aperture 180 formed in the shuttle 176. The piston 62 is disposed in the base cavity 72 and is biased towards the lower wall portion 66 by the biasing member 60.

The shuttle 176 comprises a main portion 182 and a plurality of piston supports 184. Preferably, the shuttle 176 is unitarily formed by injection molding a thermoplastic, preferably polyoxymethylene, such as that sold by E.I. DuPont de Nemours and Company under the trademark Delrin®. However, it should be appreciated that the shuttle may be formed using other materials and processes. For example, the shuttle may be formed by machining a metal. It should also be appreciated that the shuttle may be formed by joining a plurality of components.

The main portion 182 is a substantially cylindrically-shaped body. However, it should be appreciated that the main portion may be formed of other shapes. The main portion 182 comprises an outer edge 186 that is sharply defined. A definition of the outer edge 186 may be defined by the process used to form the shuttle 176. The outer edge 186 is shaped to increase a drag force applied to the piston 62 by pressurized air flowing adjacent thereto. The main portion 182 defines the aperture 180. An outer surface 188 of the main portion 182 has a diameter smaller than that of the inner surface 74 of the base portion 56 adjacent thereto. A space between the outer surface 188 of the main portion 182 and the outer wall portion 64 forms a portion of a fluid passage 190 which exists when the piston 62 is in the open position as is shown in FIG. 3. A first side 192 of the main portion 182 faces the lower wall portion 66.

The piston supports 184 are equally spaced apart and attached to the outer surface 188 and the first side 192 of the main portion 182. Preferably, each piston support is generally wedge-shaped or a rectangular-shaped body. However, it should be appreciated that the piston supports may be shaped differently or be of another shape. Each of the piston supports 184 comprises an upper edge 194 that is sharply defined. A definition of the upper edges 194 may be defined by the process used to form the piston supports 184. The upper edges 194 are shaped to increase a drag force to the piston 62 by pressurized air flowing adjacent thereto.

The piston supports 184 define an outer diameter 196 of the shuttle 176. Each of the piston supports 184 has a protuberance 195 provided on an end of the piston support 184 and opposite the upper edge 194. The protuberances 195 abut the lower wall portion 66 when the piston 62 is in a fully open position to limit the contact area between the piston 62 and the lower wall portion 66. When the piston 62 is in an open position, spaces 198 between successive piston supports 184 form a portion of the fluid passage 190.

The plug member 178 is formed from a resilient material. The plug member 178 comprises a sealing surface 200 and a base 202. A retaining groove 204 is provided between the sealing surface 200 and the base 202. The plug member 178 may be unitarily formed. However, it should be appreciated that the plug member 178 may be formed from a plurality of components.

The sealing surface 200 is formed in a distal end of the plug member 178, which is opposite a distal end of the plug member 178 formed by the base 202. The sealing surface 200 is of a circular shape and is preferably flat. However, it is understood that the sealing surface 200 may be of another shape. The sealing surface 200 is sharply defined by an outer edge 206. The outer edge 206 is shaped to decrease a flow rate of the pressurized air flowing adjacent thereto when the piston 62 is in an open position. The outer edge 206 may be defined by the process used to form the sealing surface 200.

The piston 62 is moveable from the closed position to the fully open position and between the closed position and the fully open position and vice versa to allow fluid communication between the hose member 26 and the wheel 12. The sealing surface 200 is disposed adjacent the second end 140 of the cap perforation 54 and abuts and sealingly contacts the ridge 148 so as to be in sealing contact therewith when the piston 62 is in the closed position. As shown best in FIG. 3, when the piston 62 is in an open position, a space 208 separates the ridge 148 and the sealing surface 200. When the piston 62 is in the fully open position, each of the piston supports 184 abuts the lower wall portion 66. Under certain conditions, the piston 62 may be in an open position and positioned between the closed position and the fully open position. In these embodiments, a space is provided between ends of the piston supports 184 and the lower wall portion 66 and a space between the ridge 148 and the sealing surface 200 is provided. Also, when the piston 62 is in an open position, the edge portion of the inboard face 150 and an adjacent portion of the sealing surface 200 provide a portion 210 within the assembly 10 where the flow rate of the pressurized air is reduced when compared with other portions of the assembly 10 such as, for example, adjacent the ends 96, 98 of the base perforation 90 or adjacent the second end 140 of the cap perforation 54 and ridge 148.

The base 202 may have a generally hemispherical shape (not depicted) or elongated cylindrical shape. However, it should be appreciated that the base may be of another shape. At least a portion 212 of the base 202 has a diameter which is of a length that is greater than that of the retaining groove 204. An area between the base 202 and the shuttle 174 defines a shuttle cavity 214. The shuttle cavity 214 is shaped to increase a drag force applied to the piston 62 by pressurized air flowing adjacent thereto.

The retaining groove 204 separates the sealing surface 200 and the base 202 and is defined by the area therebetween. The plug member 178 is attached to the shuttle 176 by engaging the main portion 182 and the retaining groove 204. To assemble the piston 62, the base 202 is compressed and directed through the aperture 180 and the main portion 182 is aligned with the retaining groove 204.

Figure 2:
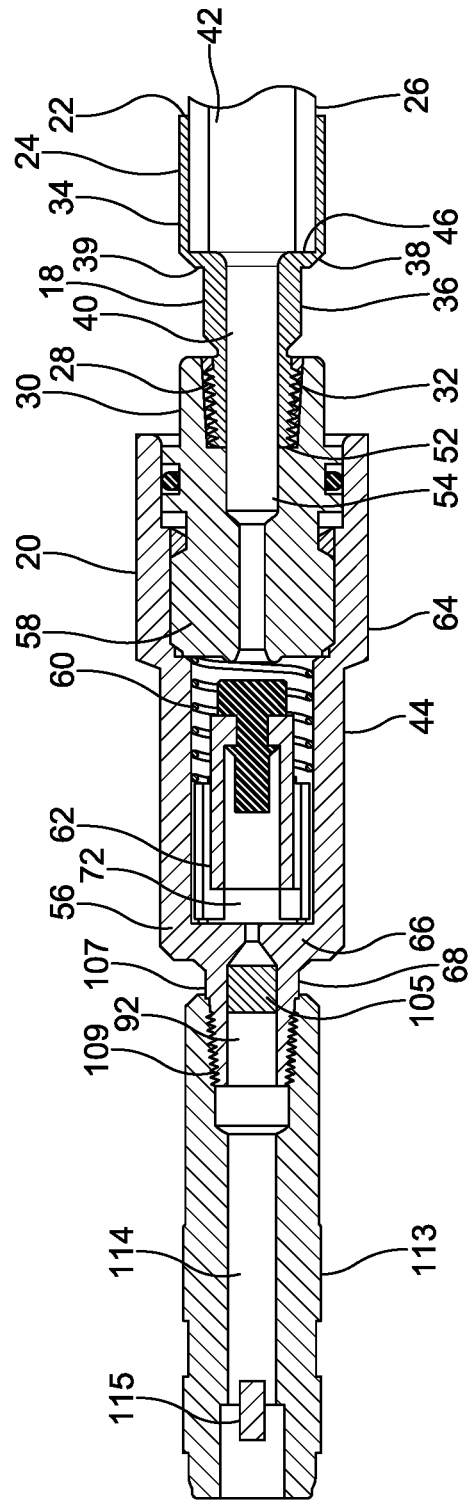
FIG. 2 depicts a sectional view of an embodiment of the assembly of FIG. 1.
Figure 2A:
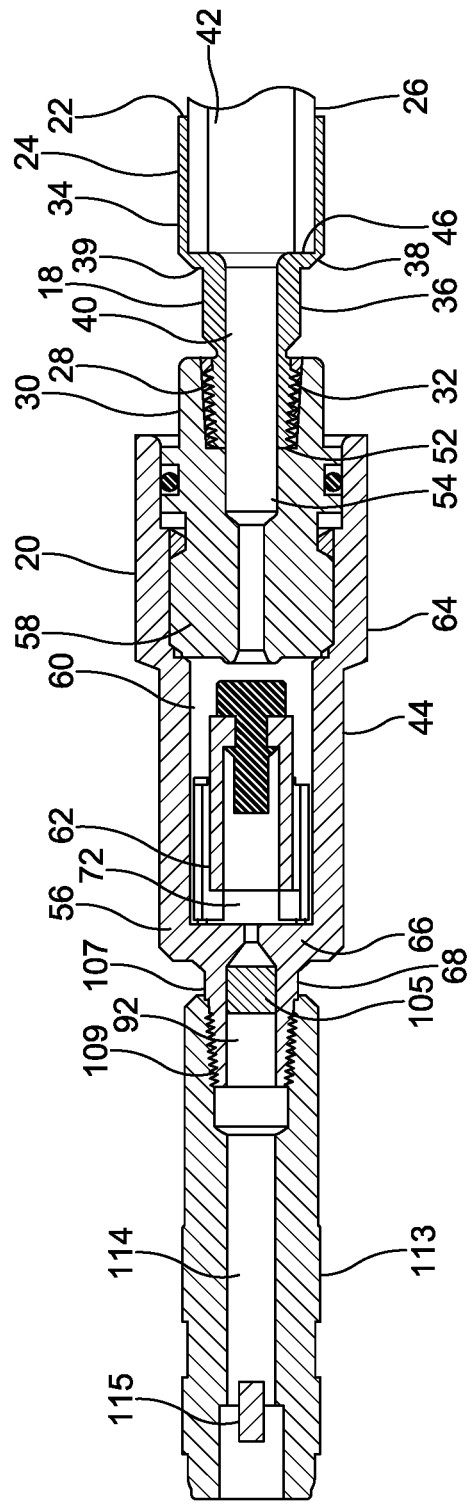
FIG. 2A depicts a sectional view of another embodiment of the assembly of FIG. 1.

The biasing member 60 is disposed between the base portion 56 and the cap portion 58 adjacent the cap perforation 54. The biasing member 60 contacts the shuttle 176 and applies a force thereto. Preferably, the biasing member 60 applies the force to the shuttle 176 via contact with the plurality of piston supports 184. In this embodiment, a first member end 216 of the biasing member 60 abuts each of the piston supports 184 and the second member end abuts the cap portion 58. In other embodiments, like the one shown in FIG. 2A, the biasing member 60 is not provided. In this embodiment, only a space separates the piston supports 184 and the inboard face 150 of the cap portion 58.

When provided, the biasing member 60 is preferably a compression spring such as, for example, a coil spring formed from a spring steel. However, it should be appreciated that the biasing member 60 may be of another kind, type, make and/or formed from another material. The biasing member 60 is pretensioned. To place the piston 62 in an open position, the biasing member 60 applies a bias the piston 62 in a direction toward the lower wall portion 66 which urges the piston toward the lower wall portion 66. When the biasing member 60 is not provided, the piston 62 is placed into an open position by urging the piston 62 toward the lower wall portion 66 utilizing only pressurized air provided by the inflation system conduit.

In an embodiment, the assembly 10 also comprises the filter 105. The filter 105 is utilized to prevent dirt and/or debris in the wheel from entering the assembly 10. The filter 105 is attached to the base portion 56. More particularly, the filter is disposed in the stem portion 68. The filter may be conventional in the art. Preferably, the filter is of a generally cylindrical shape and comprises either steel or nylon mesh.

When the piston 62 is in the closed position, the fluid passage 190 through the assembly 10 is not provided. When the piston 62 is in an open position such as, for example, the fully open position, the fluid passage 190 is provided through the assembly 10. The fluid passage 190 comprises the cap perforation 54, base perforation 90, the space between the ridge 148 and the piston 62, space between the piston 62 and the outer wall portion 164, and one or more of the spaces 198 between the piston supports 184. The fluid passage 190 also comprises the fluid conduit 40 and the fluid conduit 42 provided through the hose member 26.

When a pressure differential between the pressure within the inflation system conduit and the tire pressure is above an opening threshold, the piston 62 is in or placed in an open position. A relationship between an area A4 (hereinafter referred to as the fourth area and shown in FIG. 5), the spring rate of the biasing member 60, and the pressure differential between the pressure within the inflation system conduit and the tire pressure determines the opening threshold and facilitates placing the piston 62 in an open position. Preferably, the opening threshold is about 5 psi or more. More preferably, the opening threshold is about 5 to about 8 psi. The assembly 10 may be configured so that the piston 62 has a specific opening threshold. The piston 62 remains in an open position so long as the pressure differential between the pressure within the inflation system conduit and the tire pressure is above the opening threshold. In an open position, the sealing surface 200 does not contact the cap portion 58 which allows a flow of the pressurized air past the piston 62 from the base perforation 90 to the cap perforation 54 through the fluid passage 190 or from the cap perforation 54 to the base perforation 90 through the fluid passage 190. In the embodiments illustrated, the fourth area A4 is defined by the sealing surface 200 and the ridge 148 when the piston 62 is in the closed position and is of an unbroken circular shape.

When a pressure differential between the tire pressure and the pressure within the inflation system conduit is above a closing threshold, the piston 62 is in or placed in the closed position. Preferably, the closing threshold is about 5 to about 8 psi. The assembly 10 may be configured so that the piston 62 has a specific closing threshold. In the closed position, the plug member 178 sealingly contacts the ridge 148 on the cap portion 58 which prevents a flow of the pressurized air from the cap perforation 54 to the base perforation 90 or vice versa. The piston 62 remains in the closed position until the tire inflation system determines that the tire pressure needs to be checked and/or adjusted.

Figure 5:
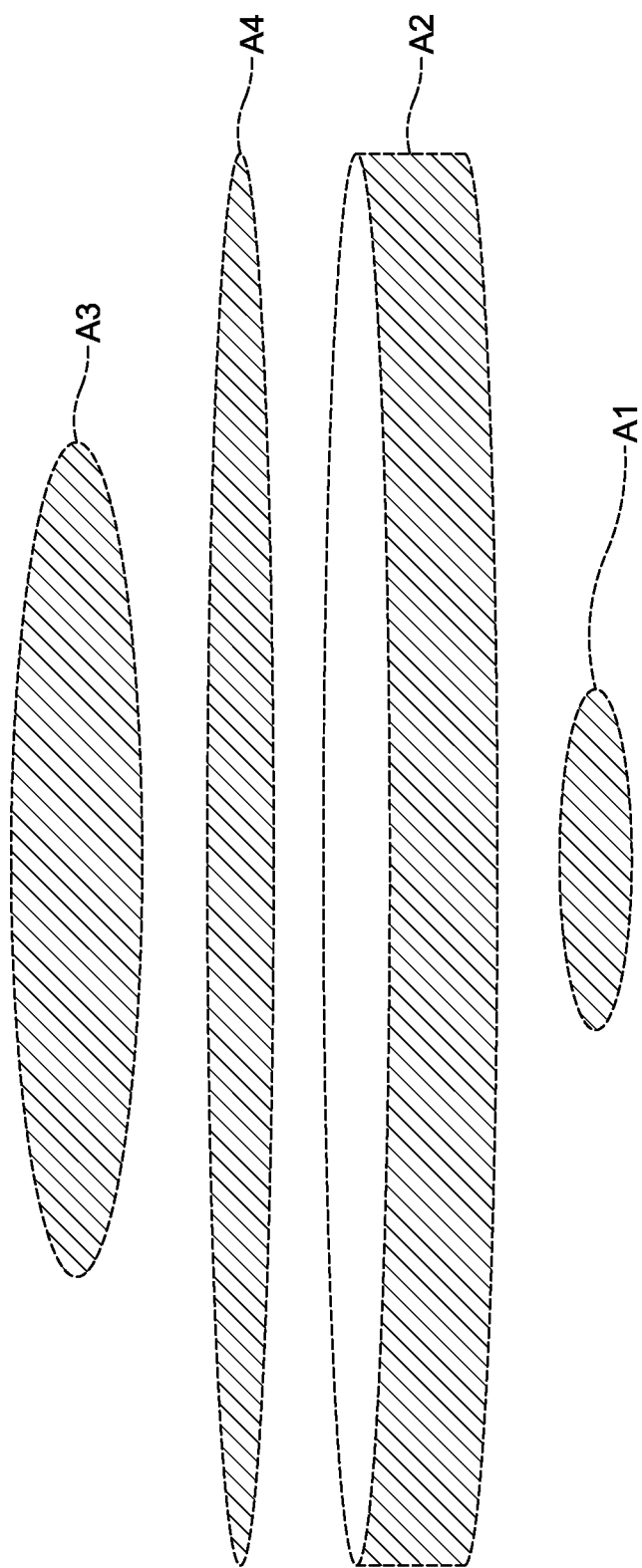
FIG. 5 depicts a perspective view of certain areas within the embodiments of the assembly.

Referring now to FIGS. 3 and 5, a relationship between an area A3 (hereinafter referred to as the third area) of the cap perforation 54, an area A2 (hereinafter referred to as the second area) between the sealing surface 200 and the ridge 148 when the piston 62 is in an open position which corresponds to an area of a side of a right cylinder and an area A1 (hereinafter referred to as the first area) of the reduced diameter of the base perforation 90 determines the closing threshold and facilitates placing the piston 62 in the closed position. The first area A1 must be smaller than the second area A2, and the third area A3 must be smaller than the second area A2 to obtain a desirable closing threshold for use with the tire inflation system. The first area A1 is smaller than the third area A3. Preferably, the first area A1 is 1-68% smaller than the third area A3. More preferably, the first area A1 is about 68% smaller than the third area A3. As noted above, the second area A2 is larger than the third area A3. Also, as noted above, the first area A1 is smaller than the second area A2. Preferably, the first area A1 is 30-90% smaller than the second area A2. More preferably, the second area A2 is 92% larger than the first area A1. Such a selection of the areas A1, A2, and A3 results in the closing threshold of about 5 to about 8 psi. As above-discussed, when the piston 62 is in an open position, one or more spaces 198 between the piston supports 184 forms a portion of the fluid passage 190. Also, as illustrated best in FIG. 5, the fourth area A4 is larger than the first area A1.

Configuring the first area A1 as described above allows the flow of pressurized air from the tire to be limited through the assembly 10. Limiting the flow of pressurized air from the tire through the assembly 10 by configuring area A1 to be smaller than area A3 provides a higher pressure in the base perforation 90 than in the cap perforation 54 when the tire pressure is being decreased. Such an arrangement allows the piston 62 to be placed into the closed position when the tire pressure has been decreased to the target tire pressure. Further, the size and position of area A1 helps to ensure that the difference in pressure of the pressurized air in the base cavity 72 between the base perforation 90 and the piston 62 and the pressure of the pressurized air in the base cavity between the piston 62 and the cap perforation 54 is large. The large pressure differential is advantageous as it provides a higher pressure for the pressurized air in the base cavity 72 between the base perforation 90 and the piston 62. Additionally, configuring the area A2 to be larger than the area A3 helps to ensure that the pressure of the pressurized air in the base cavity 72 between the base perforation 90 and the piston 62 is greater than the pressure of the pressurized air in the base cavity between the piston 62 and the cap perforation 54. Providing the pressurized air in the base cavity 72 between the base perforation 90 and the piston 62 at a higher pressure helps to place the piston 62 into the closed position when the tire pressure has been decreased to the target tire pressure. Finally, the size and position of area A4 helps to ensure that the area A4 will not affect placing the piston 62 into the closed position when the tire pressure has been decreased to the target tire pressure.

Advantageously, the assembly 10 can operate in an efficient manner at a wider range of pressures than the known designs. For example, the assembly 10 can operate at an air supply pressure and/or a tire pressure of about 30 psi to 130 psi. Further, the assembly 10 does not suffer from diminished performance under certain ambient temperature conditions which is observed in the known designs. For example, placing the piston 62 in an open position or the closed position is not affected by low temperature conditions. Additionally, after the tire pressure is increased or decreased, the piston 62 can be placed in the closed position quickly to provide a desired tire pressure.

As noted above, the assembly 10 is utilized in a tire inflation system to check, increase and/or decrease the tire pressure. The assembly 10 may be utilized to increase or decrease the tire pressure to a selected tire pressure. For example, the tire pressure may be selected by an operator of the vehicle and be from about 30 to 130 psi.

When it is desired to check, increase and/or decrease the tire pressure, the piston 62 is placed in an open position so that the wheel 12 is in fluid communication with the assembly 10 via the Schrader valve and base perforation 90 and the inflation system conduit is provided in fluid communication with the assembly 10 via the cap perforation 54, the fluid conduit 40 and the fluid conduit 42 provided through the hose member 26.

To place the piston 62 in an open position, a force is applied thereto via the pressurized air from the inflation system conduit through the cap perforation 54. The drag force applied to the piston 62 and the force applied by the biasing member 60 to the shuttle 176 urges the piston 62 towards the lower wall portion 66 and causes the sealing surface 200 to no longer sealingly contact the ridge 148 which forms the space therebetween and, when the piston 62 is in the fully open position, each of the piston supports 184 to abut the lower wall portion 66. The force applied by the biasing member 60 to the piston 62 and from the inflation system conduit through the cap perforation 54 by the pressurized air from the cap perforation 54 to the fourth area A4 places the piston 62 in an open position and is greater than the force applied by tire pressure to the piston 62 through the base perforation 90. A spring rate or another characteristic of the biasing member 60 may be adjusted to facilitate placing the piston 62 in an open position when the pressurized air from the inflation system conduit is a predetermined amount greater than the tire pressure.

The configuration of the base perforation 90, the cap perforation 54, the ridge 148, and the shuttle 176 may also facilitate placing the piston 62 in an open position. The cap perforation 54, and the ridge 148 are shaped to militate against pressure losses that occur as pressurized air flows through an orifice constriction. The outer edge 186 of the main portion 182, the upper edges 194 of the piston supports 184, and the shuttle cavity 214 are shaped to increase a drag force applied to the piston 62 by pressurized air flowing adjacent thereto. When the pressurized air flows from the cap perforation 54 to the base perforation 90, the air applies the drag force to the piston 62. The greater the pressure within the inflation system conduit, when compared to the tire pressure, the greater the drag force that is applied to the piston 62.

When it is desired to terminate increasing or decreasing the tire pressure, the piston 62 is placed into the closed position. To place the piston 62 into the closed position, a force is applied to the piston 62 by the tire pressure through the base perforation 90. The drag force applied to the piston 62 urges the piston 62 towards the cap portion 58 which causes the sealing surface 200 to sealingly contact the ridge 148. The force applied to place the valve assembly 44 into the closed position is greater than a sum of a force applied by the biasing member 60 to the piston 62 via the shuttle 176 and the force applied by the pressurized air from the cap perforation 54. Further, the spring rate or other characteristic of the biasing member 60 may be adjusted to facilitate placing the piston 62 into the closed position when the pressurized air from the base perforation 90 is a predetermined amount greater than the pressurized air from the cap perforation 54.

The configuration of the base perforation 90, cap perforation 54, ridge 148, shuttle 176 and plug member 178 also facilitate placing the piston 62 into the closed position. The base perforation 90, cap perforation 54 and the ridge 148 are shaped to militate against pressure losses that occur as pressurized air flows through an orifice constriction. The outer edge 186 of the main portion 182, the upper edges 194 of the piston supports 184, and the shuttle cavity 214 are shaped to increase a drag force applied to the piston 62 by pressurized air flowing adjacent thereto. When the pressurized air flows from the base perforation 90 to the cap perforation 54, the air applies the drag force to the piston 62. The greater the tire pressure relative to the pressure within the inflation system conduit, the greater the drag force that is applied to the piston 62.

When the piston 62 is in an open position, the inflation system conduit is in fluid communication with the wheel 12 via the assembly 10 and Schrader valve. Air in the inflation system conduit may be at a pressure which is greater or less than the tire pressure. When it is desired to increase the tire pressure, the air in the inflation system conduit is at a pressure which is greater than the tire pressure. When it is desired to decrease the tire pressure, the tire pressure is at a pressure which is greater than the pressure that the air is at in the inflation system conduit. Pressurized air is directed through the assembly 10 via the cap perforation 54, about the piston 62 and via the base perforation 90 and vice versa when the valve is in an open position.

When it is desired to place the piston 62 in an open position to check, increase and/or decrease the tire pressure, the piston 62 is urged toward the base portion 56 by forces applied by the biasing member 60 and the first pressure of the air. As the piston 62 is urged toward the base portion 56, the biasing member 60 which is positioned between the cap portion 58 and piston 62 extends toward the base portion 56. The biasing member 60 may extend until the piston supports 184 contact the base portion 56. After the tire pressure is checked, increased and/or decreased to the desired pressure, the piston 62 is placed into the closed position by urging the piston 62 toward the cap portion 58. As the piston 62 is urged toward the cap portion 58, the biasing member 60 is compressed until the sealing surface 200 sealingly contacts the cap portion 58.

The piston 62 can be placed into the closed position from an open position so that the inflation system conduit does not communicate with the wheel 12 via the assembly 10. To place the piston 62 into the closed position, the piston 62 is urged toward the cap portion 58 by the third pressure. When the plug member 178 sealingly contacts the ridge 148, the valve assembly 44 is closed. When the piston 62 is closed, fluid communication through the assembly 10 is prevented.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. An assembly for a tire inflation system, comprising:
    a valve assembly that includes:
        a housing comprising a base portion and a cap portion, the base portion having a base perforation which is in fluid communication with a base cavity, wherein the cap portion is attached to the base portion and the cap portion has a cap perforation formed therein, the cap perforation in selective fluid communication with the base cavity, and
        a piston disposed in the base cavity,
        wherein a third area is a cross-sectional area defined by the cap perforation at a portion of the cap perforation that is cylindrical and has a substantially constant diameter,
        wherein a second area is a cylindrical side area defined by a space between the piston and the cap portion when the piston is in an open position,
        wherein a first area is a cross-sectional area defined by the base perforation at a portion of the base perforation that has a substantially constant diameter that is reduced relative to a remainder of the base perforation, and
        wherein the second area is greater than the first area and the third area.

2. The assembly of claim 1, further comprising a biasing member disposed between the base portion and the cap portion adjacent the cap perforation, the biasing member contacting the piston to apply a bias thereto which urges the piston to an open position.

3. The assembly of claim 1, further comprising a biasing member disposed between the base portion and the cap portion adjacent the cap perforation, the biasing member contacting the piston to apply a bias thereto which urges the piston to an open position.

4. The assembly of claim 1, wherein the piston comprises a shuttle having a plurality of piston supports and only a space separates the piston supports and an inboard face of the cap portion.

5. The assembly of claim 1, wherein the cap perforation and the base cavity are in fluid communication when the piston is in an open position.

6. The assembly of claim 1, wherein the cap perforation is aligned with the base perforation, the portion of the cap perforation is a first portion, and wherein the cap perforation further has a second portion having a diameter which is greater than the diameter of the first portion and gradually increases toward the base cavity.

7. The assembly of claim 1, wherein the first area is greater than the first area.

8. The assembly of claim 1, further comprising a filter, the filter being disposed in a stem cavity and the stem cavity in fluid communication with the base cavity via the base perforation.

9. The assembly of claim 1, wherein the base portion comprises a wall portion that defines the base perforation and at least a portion of the base cavity, the base perforation gradually decreasing in diameter from a first end of the base perforation and having the substantially constant diameter in a center portion of the wall portion to a stem cavity.

10. The assembly of claim 9, wherein a portion of the stem cavity gradually increases in diameter from the base perforation toward a first end of the housing and a remaining portion of the stem cavity is of a substantially constant diameter.

11. The assembly of claim 1, further comprising an adapter attached to the base portion on an end and a valve stem on another end, the adapter comprising a depressor member which is in contact with a Schrader valve disposed within the valve stem.

12. The assembly of claim 1, further comprising another housing which is directly attached to the cap portion via a threaded connection.

13. The assembly of claim 12, wherein the housings are in fluid communication.

14. The assembly of claim 1, wherein the cap portion comprises an inboard portion and a wall portion, the cap perforation being formed through the inboard portion and wall portion.

15. The assembly of claim 14, wherein the inboard portion is disposed within the base portion and comprises an outer surface which abuts an inner surface of the base portion.

16. The assembly of claim 1, wherein the base portion and the cap portion are each formed in a unitary manner.

17. An assembly for a tire inflation system, comprising:
a valve assembly that includes:
a housing comprising a base portion and a cap portion, the base portion having a base perforation which is in fluid communication with a base cavity, wherein the cap portion is attached to the base portion and the cap portion has a cap perforation formed therein, the cap perforation in selective fluid communication with the base cavity, and
a piston disposed in the base cavity,
wherein a cylindrical side area defined by a space between the piston and the cap portion when the piston is in an open position is greater than a cross-sectional area defined by the cap perforation at a portion of the cap perforation that is cylindrical and has a substantially constant diameter, and
wherein the cylindrical side area defined by the space between the piston and the cap portion when the piston is in the open position is greater than a cross-sectional area defined by the base perforation at a portion of the base perforation that has a substantially constant diameter that is reduced relative to a remainder of the base perforation.

* * * * *